June 6, 1933.  H. E. WARREN  1,913,179

ELECTRIC MOTOR

Filed Nov. 29, 1932

Inventor:
Henry E. Warren,
by Chas. C. Mullen
His Attorney.

Patented June 6, 1933 1,913,179

UNITED STATES PATENT OFFICE

HENRY E. WARREN, OF ASHLAND, MASSACHUSETTS, ASSIGNOR TO WARREN TELE-CHRON COMPANY, OF ASHLAND, MASSACHUSETTS, A CORPORATION OF MAINE

ELECTRIC MOTOR

Application filed November 29, 1932. Serial No. 644,817.

My invention relates to electric motors, and in particular to the structure of that portion of the stator adjacent the rotor.

In small high speed motors such as that described in my Patent No. 1,495,936, it is desirable to inclose the rotor by a protective casing. This casing may be integral with a speed reducing gear casing which contains the rotor bearings and which with the rotor is removable as a unit from the stator, and which when inserted between the stator pole pieces centrally aligns the rotor therein. In the motor described in the above patent the housing for the rotor was made of non-magnetic material. According to the present invention I provide a removable inclosing housing for the rotor, which is made of magnetic material of such dimensions and design as to properly direct and distribute the flux from the main portion of the stator to the rotor. This magnetic housing serves the purpose of stator pole tips to effect a somewhat more desirable flux distribution than exists in the previous motor. This magnetic rotor housing may be combined with a gear casing and rotor bearings as a unitary structure which is removable from the stator.

The features of my invention which are believed to be novel and patentable will be pointed out in the claims appended hereto. For a better understanding of my invention reference is made in the following description to the accompanying drawing, which illustrates in Fig. 1 an end view of a motor equipped with a preferred form of my magnetic rotor housing. Fig. 2 is a perspective view of the magnetic rotor housing, and Fig. 3 illustrates one way of combining the housing with a gear casing.

Figure 1:
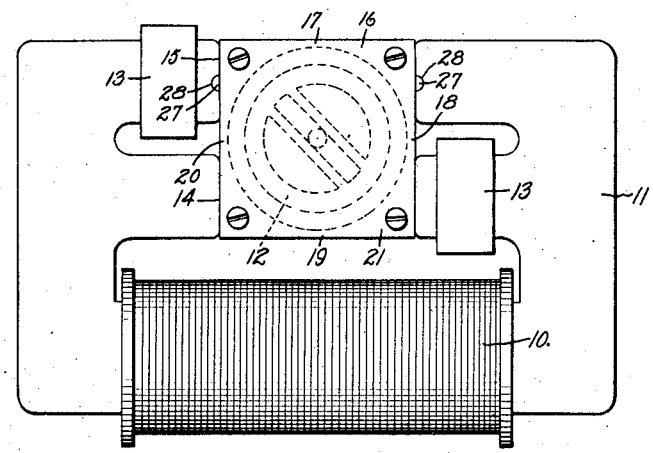
Figure 2:
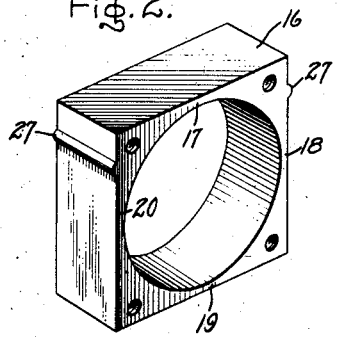

Referring now to Fig. 1, I have here represented a bipolar, single phase, shaded pole motor of the synchronous type, where a single phase coil 10 produces an alternating flux through the stator iron 11 and magnetic rotor 12. Shading coils 13 are provided on halves of the split pole portions to change the alternating flux into a flux having a rotating component through the rotor, as is well understood in the art. The pole portions are preferably cut off flat, as indicated at 14 and 15, and separated by a cubical shaped space which is occupied by the cubical shaped magnetic rotor housing piece 16. The stator part 11 is preferably laminated and the part 16 is preferably unlaminated. Part 16 may be made of soft iron or of a material having a lower permeability, such as Monel metal. The central portion of part 16 is bored out axially to form the rotor cavity, leaving the wall quite thin at the four points 17, 18, 19, and 20. The parts at 17 and 19 are sufficiently thin to cause saturation at a low value of motor flux so that they become substantially the equivalent of air gaps for normal motor flux values, causing the greater portion of the flux to pass through the magnetic rotor 12. The parts at 18 and 20 are also sufficiently thin to prevent any undesirable interference with the proper phase split of the flux in the rotor space. Sufficient material remains at these points however to prevent undesirable mechanical weakness. The arrangement has the effect of extending the pole face area to practically 100% of the rotor periphery without materially decreasing the rotational component of flux through the rotor, resulting in a desirable flux distribution.

This integral pole tip assembly 16 has a snug fit between the opposite faces of the split poles of the stator 11, and is preferably held in place by the tightness of this fit, but may be removed without difficulty. As shown, the part 16 is square shaped and has plain surfaces abutting against the split pole faces with the other sides in alignment with the sides of the pole pieces of the stator, but I do not confine myself to this exact arrangement.

Figure 3:
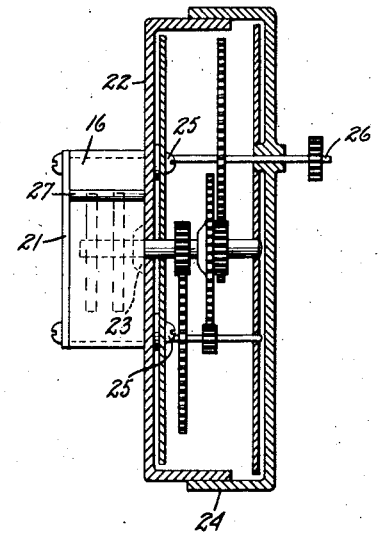

The magnetic rotor housing may be closed at its ends by non-magnetic plates 21 and 22, as shown in Fig. 3, and one or both plates may support rotor bearings, one being indicated at 23. The housing may be assembled as a unitary part of a gear casing 24 in any suitable manner, one example of such assembly being represented in Fig. 3, where the gear casing is secured to the housing by four screws 25 threaded into the four corners of the housing, the screws being accessible during the assembling of the gear casing. Here the wall 22 of the gear casing forms a closure for the adjacent end of the housing 16. The direction of rotation of the terminal shaft represented at 26 may be changed by inserting the part 16 into the stator 11 from opposite sides thereof. To assure proper alignment, one or more axial ribs 27 may be provided on the faces of housing 16, fitting into corresponding grooves 28 in the adjacent faces of the stator poles.

Such modifications of the invention as above described as do not depart from the true spirit and scope of the invention are intended to be included in the appended claims.

What I claim as new and desire to secure by Letters Patent of the United States is:

1. A bipolar electric motor having a magnetic stator core with pole pieces separated by a substantially cubical shaped air gap and a removable cubical shaped magnetic member fitting snugly between said pole pieces, said member having a central axial cylindrical bore forming a rotor cavity therein, leaving thin bridges between the pole pieces on opposite sides of the cavity.

2. An electric motor having a stator with a pair of pole pieces separated by a cubical shaped space, a removable block shaped member of magnetic material snugly fitting between said pole pieces in said space, said member having a circular axial bore forming a rotor cavity of such dimensions that the magnetic material remaining in said member bridging the pole pieces on opposite diameters of the cavity will saturate at a low value of the motor flux.

3. A bipolar electric motor having a stator core with spaced pole pieces facing each other, a removable block shaped piece of magnetic material snugly fitting between said pole pieces, said block shaped piece having a central axial circular bore of such dimensions as to leave only thin wall portions in said piece on opposite sides of the cavity midway between the pole pieces, and non-magnetic end closures for said piece.

4. A bipolar electric motor having a stator core with spaced pole pieces facing each other, a removable block shaped member of magnetic material snugly fitted between said pole pieces, said block shaped piece having a central axial circular bore forming a rotor cavity between said pole pieces and leaving thin saturable walls in said block shaped piece on opposite diameters of the cavity between the pole pieces, a gear casing secured to said piece and having a wall thereof closing one end of the bore in said piece and having a shaft extending axially into the bore, and a rotor for said motor mounted on said shaft in the cavity.

5. A bipolar electric motor having a U-shaped core with pole pieces facing each other, said pole pieces being split into halves and having shading coils on one half of each pole, a removable rotor housing comprising an integral piece of magnetic material snugly fitting between said pole pieces, a magnetic rotor for the motor rotatively mounted within said housing, the walls of said housing varying in thickness about the rotor to provide a desirable distribution of flux between the pole pieces and rotor.

6. A bipolar electric motor having a stator core with spaced pole pieces of rectangular cross-section facing each other, said pole pieces being split into two halves with shading coils on one-half of each pole, a rotor housing comprising a cubical shaped integral piece of magnetic material with a central axial circular bore, said housing fitting snugly between said pole pieces with opposite sides abutting against the spaced pole pieces and its four other sides substantially in alignment with the sides of said pole pieces, and a rotor for said motor in said housing, the diameter of the bore of said housing being such as to make the wall portions of said housing opposite the splits in said pole pieces and midway between the pole pieces thin enough to prevent diversion of any substantial portion of the motor flux.

In witness whereof, I have hereunto set my hand.

HENRY E. WARREN.